Patented May 13, 1930

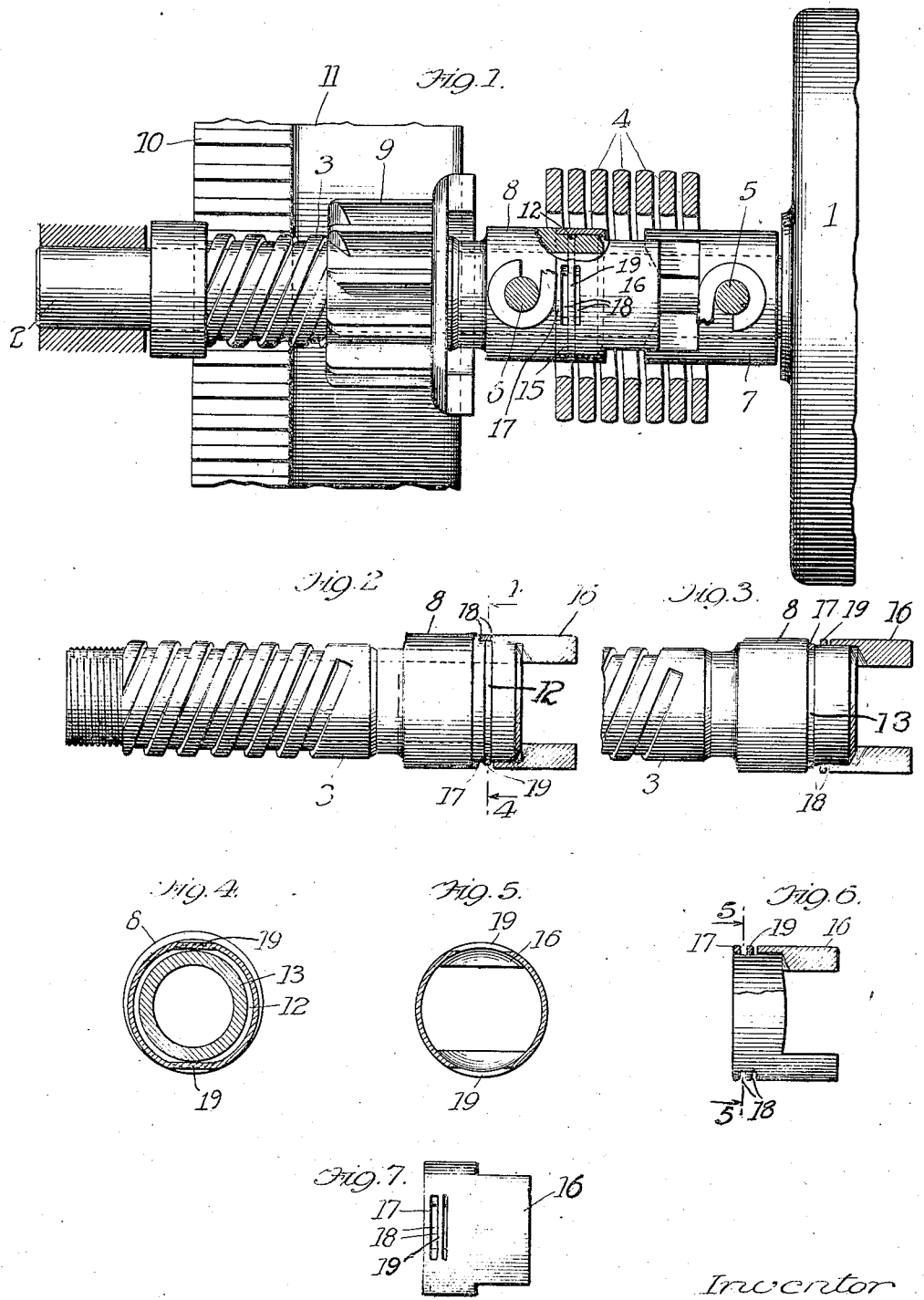

1,758,301

UNITED STATES PATENT OFFICE

HENRY E. VAN NESS, OF ELMIRA, NEW YORK, ASSIGNOR TO ECLIPSE MACHINE COMPANY, OF ELMIRA, NEW YORK, A CORPORATION OF NEW YORK

ENGINE STARTER

Application filed February 7, 1923. Serial No. 617,426.

My invention relates to a starter for an engine such as an internal combustion engine and pertains to that part thereof known as the drive or transmission which operatively connects the prime mover such as an electric motor with a member of the engine to be started such as the flywheel thereof. Specifically, my invention relates to a new form of sleeve which is attached to the screw shaft of the well-known Bendix drive, such as exemplified by Bendix Patent No. 1,125,935 issued January 26, 1915, such sleeve being attached to one end of the screw shaft and being located within the drive spring. My new form of sleeve while primarily produced as a replacement for a broken sleeve may be utilized as the sleeve incorporated in the regular commercial drive as originally produced by the factory.

In the drawings, Figure 1 is a sectional elevation of a starter including a drive of said well-known construction and illustrating my new form of sleeve applied thereto; Fig. 2 is a separated elevational view of the screw shaft with my new form of sleeve shown in section and attached thereto, such screw shaft being of the present commercial manufacture; Fig. 3 a view similar to Fig. 2 but illustrating a screw shaft of somewhat earlier production with the circumferential groove immediately adjacent the driving head of the shaft; Fig. 4 a cross section on the line 4—4 of Fig. 2; Fig. 5 a section on the line 5—5 of Fig. 6; Fig. 6 an elevation partly in section of my new form of sleeve; and Fig. 7 another elevation of such new sleeve.

Referring to the starter system as shown in Fig. 1, the electric motor 1 has an extended armature shaft 2 on which is mounted a screw shaft 3. This latter shaft is operatively connected in the usual way to the armature shaft by means of the drive spring 4 connected at its ends by means of the screws 5 and 6 to a driving head 7, secured to such armature shaft and to a driven head 8 which forms a part of the screw shaft itself. The pinion 9 is threaded upon the screw shaft and is adapted to mesh with the teeth 10 of the engine member or flywheel 11.

The screw shaft of present day construction is shown in Fig. 2 according to which the driven end of such shaft is provided at one side of the driven head 8 with a circumferential groove 12, the sides of which are in planes transverse to the axis of the shaft. This groove is located at a little distance from the outer end of the head 8 but in a previous form of screw shaft, such as illustrated in Fig. 3 such groove 13 is located immediately adjacent such head 8. My new form of sleeve about to be described is intended for utilization with either one of these two constructions of screw shaft. The usual form of sleeve now commonly applied in regular production is counterbored at one end and the material thereof is spun into the groove 12 as will be well understood. This sleeve is attached to the screw shaft in such manner as to permit of relative rotary movement but to prevent any longitudinal movement.

My new form of sleeve is so made as to readily replace any broken or damaged sleeve and to be applied to the screw shaft in an easy manner and without any special tools. As shown, such sleeve 16 has one end counterbored so as to fit upon the extended end of the screw shaft and to have a relative rotary movement with respect thereto. I provide this sleeve with a weakened portion which is adapted to be displaced in order to engage the shaft. To this end and by preference I make two cuts or kerfs 18 in the thin walls of the sleeve which overlap the screw shaft, which kerfs are in a plane at right angles to the axis of the sleeve thus forming strips with flat sides transverse to the axis of the sleeve. By preference I make a pair of these kerfs on opposite sides of the sleeve as shown in Figs. 5 and 6. The provision of these kerfs leaves an intervening weakened portion 19 which is in register with the groove 12 of the shaft construction shown in Fig. 2, with the result that such portion or portions 18 can be readily pressed inwardly into the groove with a simple tool such as an ordinary screw driver the sides of the strips cooperating with the sides of the groove to form a swivel with transverse bearing surfaces. These kerfs also provide at the extreme edge of the sleeve 16 another thin or weakened portion 17 which in the case of the other shaft construction shown in Fig.

3, is the one which is pressed into the groove 13 of that shaft.

In this manner and by these means I provide a simple and efficient sleeve which can be readily applied to a screw shaft as a replacement for any broken or damaged sleeve. Moreover, such sleeve may be utilized in the regular production of the drive at the factory if desired.

I claim:

1. For use with a drive shaft, a sleeve having two parallel slots through its walls at right angles to its axis and an intervening weakened portion which is adapted to be displaced to engage such shaft.

2. In combination with a drive shaft having a groove adjacent one end, a sleeve having two parallel slots through its walls at right angles to its axis and an intervening weakened portion which is adapted to be displaced inwardly and disposed in said groove.

3. For use with a drive shaft, a swivel sleeve slotted through its wall in a plane at right angles to its axis near one end thereof and partway of its circumference to provide an arcuate weakened portion which is adapted to be displaced inwardly to form transverse bearing surfaces adapted to engage such shaft.

4. For use with a circumferentially grooved drive shaft, a sleeve to be engaged with such shaft, said sleeve being circumferentially slotted through its side wall near one end thereof to provide a short circumferentially-extending strip that at its ends is integrally attached to the body of the sleeve and at its mid-portion is free from said sleeve-body and adapted for radial deflection to engage in the groove in said shaft.

5. For use with a circumferentially grooved drive shaft, a sleeve to be engaged with such shaft, said sleeve being circumferentially slotted through its side wall near one end thereof to provide oppositely disposed short circumferentially-extending strips that at their ends are integrally attached to the body of the sleeve and at their mid-portions are free from said sleeve-body and adapted for radial deflection to engage in the groove in said shaft.

HENRY E. VAN NESS.